JOHN E. LIARDET.
Improvement in Spring-Links for Wire-Rigging, &c.
No. 127,491. Patented June 4, 1872.

Witnesses.

JOHN E. LIARDET.
Improvement in Spring-Links for Wire-Rigging, &c.
No. 127,491. Patented June 4, 1872.

127,491

UNITED STATES PATENT OFFICE.

JOHN EVELYN LIARDET, OF MIDDLESEX COUNTY, ENGLAND.

IMPROVEMENT IN SPRING-LINKS FOR WIRE RIGGING, &c.

Specification forming part of Letters Patent No. 127,491, dated June 4, 1872.

*To all to whom it may concern:*

Be it known that I, JOHN EVELYN LIARDET, of Waverley, near the city of Sydney, in the Colony of New South Wales, now residing at Ranworth Cottage, Walham Green, Fulham Road, in the county of Middlesex, England, gentleman, a subject of the Queen of Great Britain, have invented or discovered new and useful improvements in apparatus to be used in connection with cables, ropes, or chains, for mooring, towing, and the rigging of ships, to secure them from the risk of breaking when exposed to sudden strain or tension; and I, the said JOHN EVELYN LIARDET, do hereby declare the nature of the said invention, and in what manner the same is to be performed, to be particularly described and ascertained in and by the following statement thereof—that is to say:

This invention has for its object improvements in apparatus to be used in connection with cables, ropes, or chains for mooring, towing, and the rigging of ships, to secure them from the risk of breaking when exposed to sudden strain or tension. The improved apparatus consists of a spring-link, composed of a double-headed cradle, with two series of springs and their pistons and parts, which is inserted into or connected with the cable, rope, or chain.

The link consists of an open cylindrical cradle, formed by uniting two plates or disks of metal by means of metallic rods or bars of such thickness, and placed at such intervals from each other as will secure to the cradle the same amount of strength as that of the cable, rope, or chain into which it is to be inserted or with which it is be connected, and as will also allow for the compression, expansion, and reaction between them of elastic disks within the cradle, and hereinafter described. Through the center of each of the plates or disks so united, as aforesaid, there is inserted a metallic rod or piston, fastened by nuts, forelocked or otherwise, so as to prevent the pistons coming in violent contact with each other on a sudden reaction in length about half the length of the cradle. The inserted extremities of these rods or pistons meet in the center of the cradle, and are each terminated within the cradle by a metal plate or disk and nuts, as aforesaid, into which the extremities of the rods or pistons are fastened. The end of each rod or piston outside the cradle is furnished with a head, and by means of a hole or aperture in which the end of each piston can be attached to the cable, rope, chain, or other similar article into which the link is to be inserted or shackled or with which it is to be connected. Upon each of the rods or pistons are fitted, within the cradle, alternate disks of vulcanized India rubber or other similar elastic substance, and of iron, wood, or other rigid material, so as to secure the full elasticity of each India-rubber disk, sufficient in number to fill up the space between the inside of the end plate or disk of the cradle and the plate or disk at the extremity of each rod or piston. The thickness of the disks of vulcanized India rubber or other similar elastic substance, and of iron or wood, will depend on the amount of strain or tension which it is proposed that the link shall be capable of sustaining.

When the link thus described is inserted into or connected with any cable, rope, or chain, the liability of such cable, rope, or chain to break, in consequence of sudden strain or tension, is diminished. The effect of such sudden strain or tension is to draw the rods or pistons apart from each other, thus giving an increased length to the cable, rope, chain, or other similar article; and the elastic disks within the cradle, by changing their form according to the strain or tension applied, allow the rods or pistons to be thus drawn from each other; and when the strain or tension is removed, the rods or pistons resume their original position.

The cradle may be inclosed in a case, or left uninclosed, according to circumstances.

The degree of strain or tension to which the cable, rope, chain, or other similar article into which the link is inserted or with which it is connected, is being subjected, may be ascertained by means of an indicating-hand, attached to the ends of either of the rods within the cradle, and moving outside the cradle as the rods or pistons move within the cradle, notifying the amount of pressure upon the cradle.

The advantages gained by making spring-links with double series of springs and their pistons and parts combined in one cradle are great, as it enables the cable or chain to which it is connected to be stretched as much as with the single link, with half the amount of motion of the pistons, rendering them less liable to break or bend; and at the same time the link can be condensed into a smaller space, and be made with less cost, than two single spring-links.

In order that my said invention may be most fully understood and readily carried into effect, I will proceed to describe the drawing hereunto annexed.

A A are metal bars, connecting together two end disks, B B, so as to form a cylindrical cradle. C C are nuts which secure the ends of the bars A. D D are piston-rods passing through the disks B B and secured by nuts E E. These nuts are screwed and forelocked or keyed onto the ends of the rods D beyond the pistons F F, through which the piston-rods also pass. G G are a series of disks, alternately of iron and of vulcanized India rubber. They are strung upon the piston-rods, between the end disks B B of the cradle and the pistons F F. The piston-rods D have eyes at their ends to receive shackles H H for connecting chains to them. I I are washers inserted between the shackles and the disk B.

Figure 1:
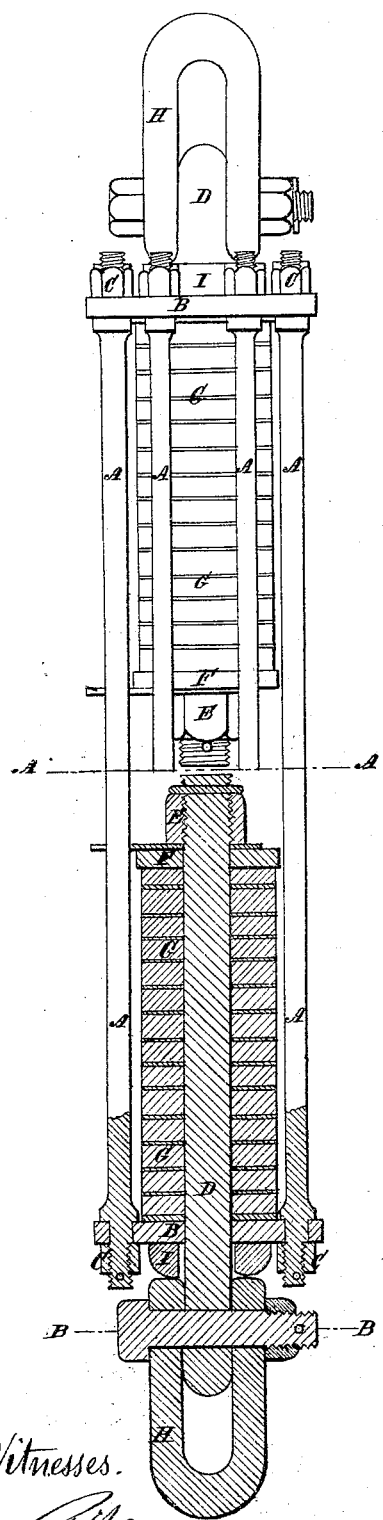
Figure 1 shows a spring-link constructed according to my invention. One-half of the figure is in elevation and the other in section.
Figure 2:
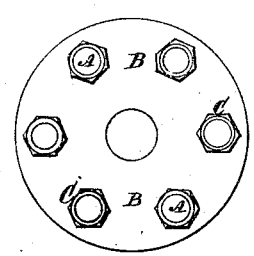
Figure 4:
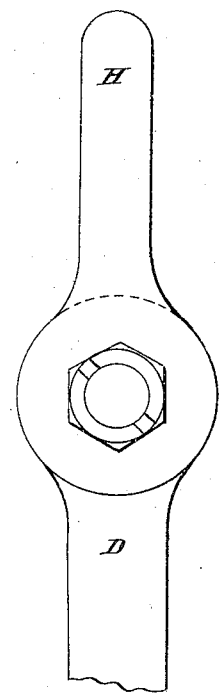
Figure 4:
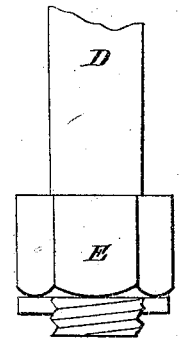
Figure 3:
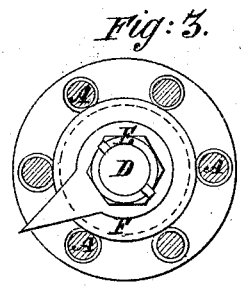
Figure 5:
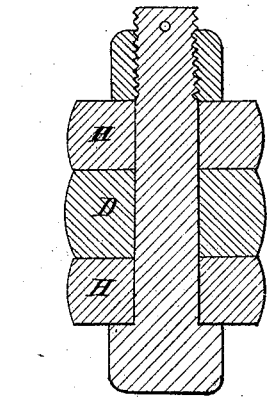
Figure 6:
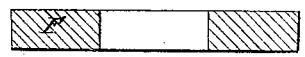
Figure 7:
Figure 7:
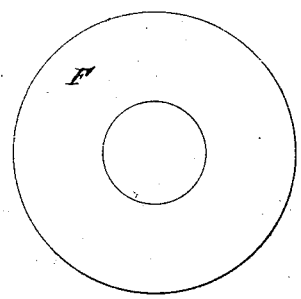
Figure 7:
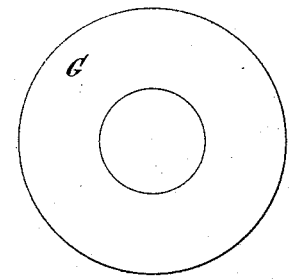
Figure 8:

Fig. 2 shows one of the disks B and the ends of the bars A, with their nuts C. Fig. 3 is a transverse section taken at the line A A, Fig. 1. Fig. 4 shows one of the rods D, with its nut E. Fig. 5 is a section on the line B B, Fig. 1. Fig. 6 shows one of the pistons F. Fig. 7 shows one of the India-rubber disks G. Fig. 8 shows one of the washers H.

Figure 9:
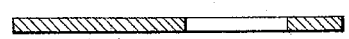
Figure 9:
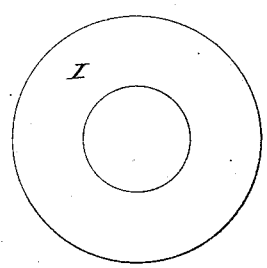
Figure 9:
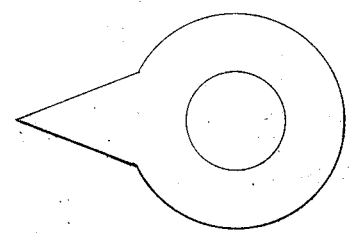

In Fig. 3 an index or pointer is shown attached to one of the pistons F, to indicate the strain upon the link. It is also represented by the Fig. 9. It points upon a scale marked upon one of the bars A.

Figure 10:
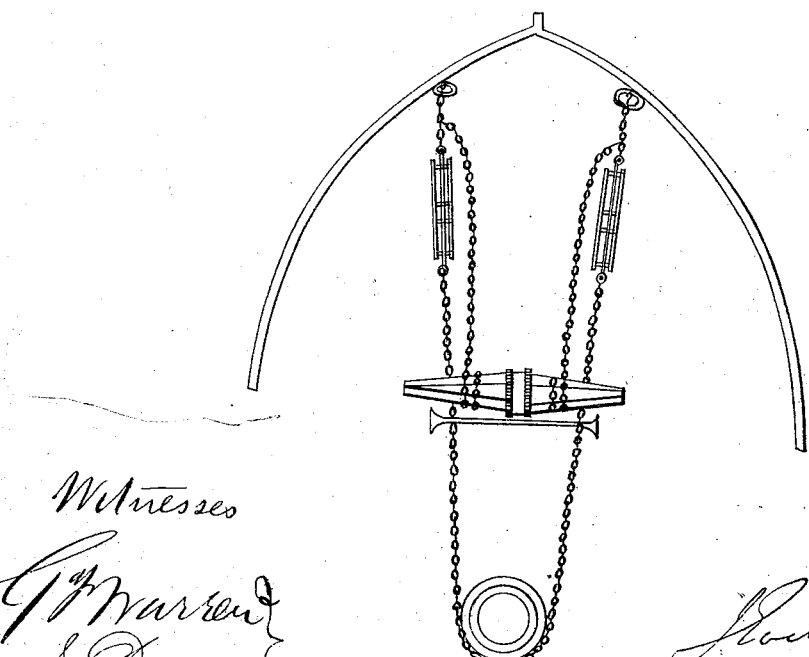

Fig. 10 represents a manner in which the spring-links may be employed in connection with anchor-cables.

I am aware that spring-links have been constructed with one series of springs in a cradle; and also that spring-links with double heads have been made, as shown in the patent granted to I. Bingham July 24, 1860. I therefore do not claim such constructions.

Having thus described the nature of my said invention and the manner of performing the same, I would have it understood that I claim—

The combination of a double-headed cradle with two series of springs and their pistons and piston-rods, substantially as described, in the construction of spring-links to be used in connection with cables, ropes, or chains, for mooring, towing, and the rigging of ships, to secure them from the risk of breaking when exposed to sudden strain or tension.

J. EVELYN LIARDET.

Witnesses:
    G. F. WARREN,
    JNO. DEAN,
*Both of No. 17 Gracechurch street, London.*
    JOHN HARRISON,
        *Notary Public.*